(12) United States Patent (10) Patent No.: US 10,148,400 B2
Zhang et al. (45) Date of Patent: Dec. 4, 2018

(54) METHOD AND APPARATUS FOR REFERENCE SIGNAL TRANSMITTING AND RECEIVING IN ACTIVE ANTENNA SYSTEMS

(71) Applicant: Samsung Electronics Co., Ltd., Gyeonggi-do (KR)

(72) Inventors: Ranran Zhang, Beijing (CN); Chen Chen, Beijing (CN); Hao Ni, Beijing (CN); Zhichun Shen, Beijing (CN); Xiaohui Yang, Beijing (CN)

(73) Assignee: Samsung Electronics Co., Ltd (KR)

( * ) Notice: Subject to any disclaimer, the term of this patent is extended or adjusted under 35 U.S.C. 154(b) by 159 days.

(21) Appl. No.: 15/321,445

(22) PCT Filed: Jun. 23, 2015

(86) PCT No.: PCT/KR2015/006369
§ 371 (c)(1),
(2) Date: Dec. 22, 2016

(87) PCT Pub. No.: WO2015/199414
PCT Pub. Date: Dec. 30, 2015

(65) Prior Publication Data
US 2017/0214505 A1 Jul. 27, 2017

(30) Foreign Application Priority Data
Jun. 23, 2014 (CN) .......................... 2014 1 0282799

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0617* (2013.01); *H04B 7/0626* (2013.01);
(Continued)

(58) Field of Classification Search
CPC ... H04L 5/0048; H04L 5/0073; H04L 5/0005; H04L 1/0041; H04W 24/08; H04W 72/046; H04B 7/0617; H04B 7/0626
(Continued)

(56) References Cited

U.S. PATENT DOCUMENTS 9,769,812 B2 * 9/2017 Chae ................... H04W 72/042
9,806,926 B2 * 10/2017 Xu ....................... H04L 27/2607
(Continued)

FOREIGN PATENT DOCUMENTS

WO WO 2014073846 5/2014

OTHER PUBLICATIONS

PCT/ISA/210 Search Report issued on PCT/KR2015/006369 (pp. 3).
PCT/ISA/237 Written Opinion issued on PCT/KR2015/006369 (pp. 7).

*Primary Examiner* — Thai Hoang
(74) *Attorney, Agent, or Firm* — The Farrell Law Firm, P.C.

(57) ABSTRACT

Embodiments of the present disclosure provide reference signal transmitting and receiving methods and devices in an active antenna system. Port virtualization to a transmit antennas may be implemented for multiple cell-specific reference signal (CRS) antenna ports and applying different vertical beamforming vectors to implement port virtualization for the different CRS antenna ports. The User Equipment (UE) reports the maximum RSRP/RSRQ value measured based on multiple CRS ports, or the UE simultaneously reports multiple RSRP/RSRQ values and the information of the multiple CRS antenna ports. Therefore, the coverage problem of the CRS signal and Physical Broadcast Channel (PBCH)/Physical Downlink Control Channel (PDCCH)/Physical Downlink Shared Channel (PDSCH) demodulated based on CRS and the problem of
(Continued)

measurement for Radio Resource Management (RRM) in the active antenna system may be avoided. Specifically, the following problems may be solved. 1) Coverage differences between CRS and PBCH/PDCCH/PDSCH demodulated based on CRS transmission and Enhanced PDCCH (E-PD-CCH)/PDSCH signal transmission, which is measured based on the CSI-RS or demodulated based on the DMRS may be reduced or avoided. 2) The cell association problem due to the different vertical beamforming technologies adopted by the CSI-RS or DMRS and by the CRS may be avoided. 3) Deep spatial fading state may be avoided for CRS reception and PBCH/PDCCH/PDSCH demodulated based on the CRS.

21 Claims, 9 Drawing Sheets

(51) Int. Cl.
  *H04W 24/08* (2009.01)
  *H04W 72/04* (2009.01)
  *H04B 7/06* (2006.01)
  *H04L 1/00* (2006.01)

(52) U.S. Cl.
  CPC .......... *H04L 1/0041* (2013.01); *H04L 5/0005* (2013.01); *H04L 5/0073* (2013.01); *H04W 24/08* (2013.01); *H04W 72/042* (2013.01); *H04W 72/046* (2013.01)

(58) Field of Classification Search
  USPC ......... 370/329–330, 252, 335–337, 339–348
  See application file for complete search history.

(56) References Cited

U.S. PATENT DOCUMENTS

| | | |
|---|---|---|
| 2013/0107746 A1 | 5/2013 | Wang et al. |
| 2013/0315191 A1 | 11/2013 | Yoshimoto et al. |
| 2013/0329772 A1 | 12/2013 | Wernersson et al. |
| 2014/0098689 A1 | 4/2014 | Lee et al. |
| 2014/0233474 A1* | 8/2014 | Wu ............... H04L 5/0016 370/329 |
| 2015/0124688 A1* | 5/2015 | Xu ............... H04B 7/0452 370/312 |
| 2015/0223209 A1* | 8/2015 | Seo ............... H04B 7/0413 370/329 |
| 2015/0237602 A1* | 8/2015 | Chae ............... H04W 72/042 370/329 |
| 2015/0280872 A1* | 10/2015 | Berggren ............... H04L 5/0023 370/330 |
| 2015/0358132 A1* | 12/2015 | Wallen ............... H04L 5/0023 370/329 |
| 2016/0134402 A1* | 5/2016 | Park ............... H04L 27/2607 370/329 |
| 2017/0214505 A1* | 7/2017 | Zhang ............... H04L 5/0048 |
| 2018/0034608 A1* | 2/2018 | Seo ............... H04W 4/70 |

* cited by examiner

[Fig. 1]
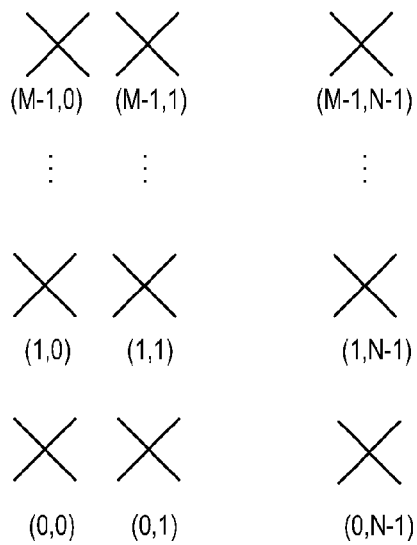
[Fig. 2]
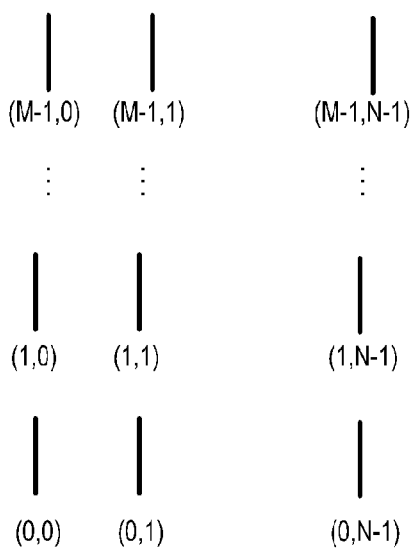
[Fig. 3]
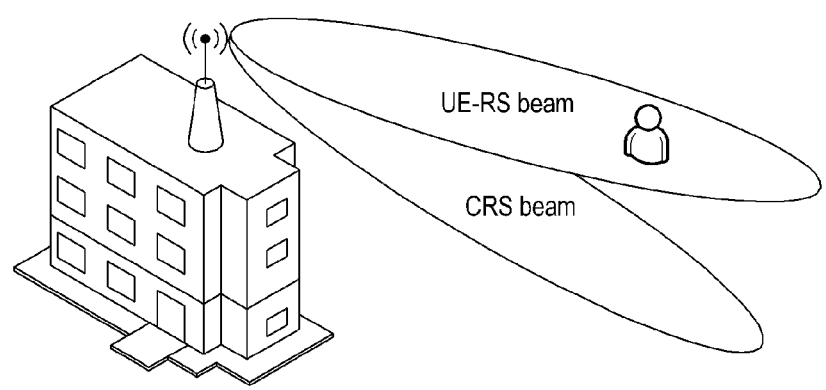

[Fig. 4]
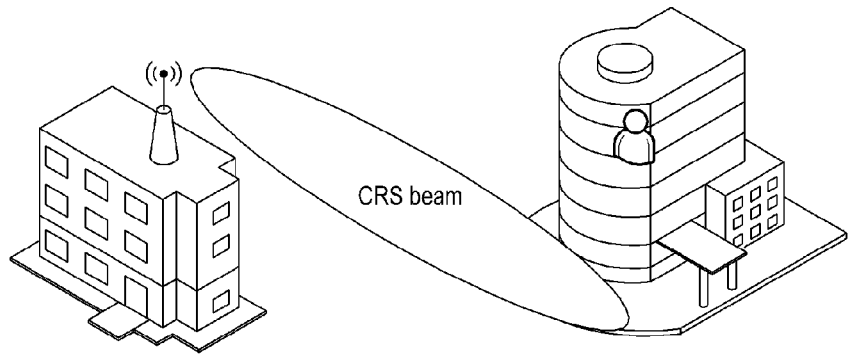
[Fig. 5]
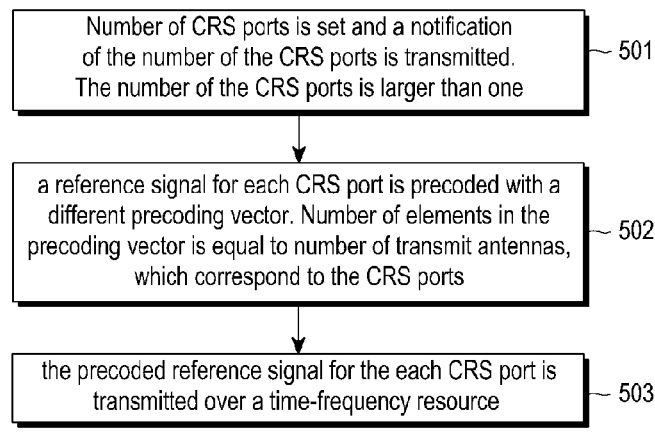
[Fig. 6]
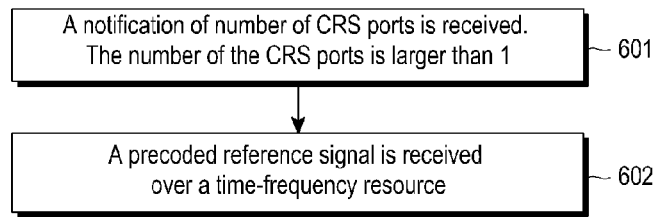
[Fig. 7]
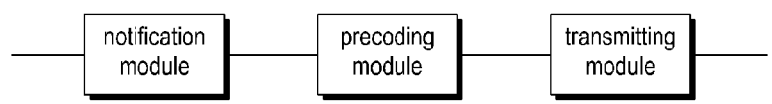
[Fig. 8]

[Fig. 9]
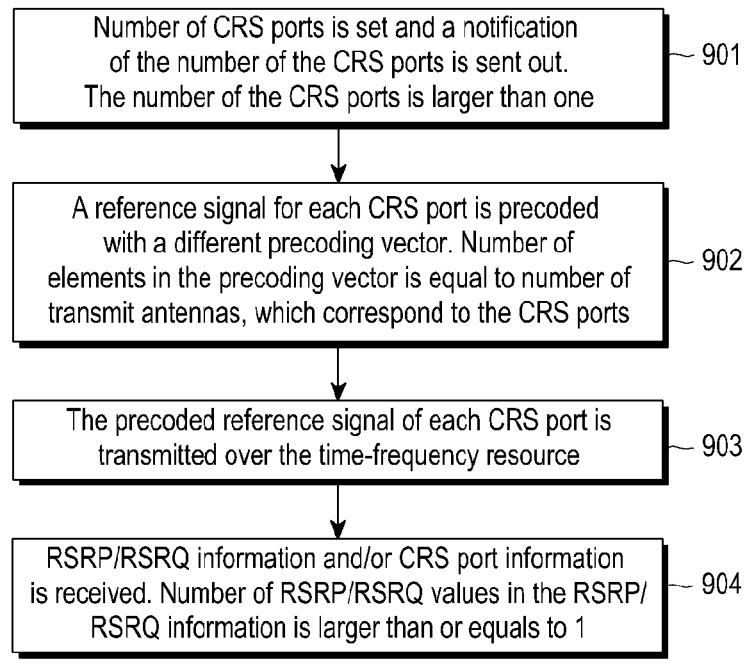
[Fig. 10]
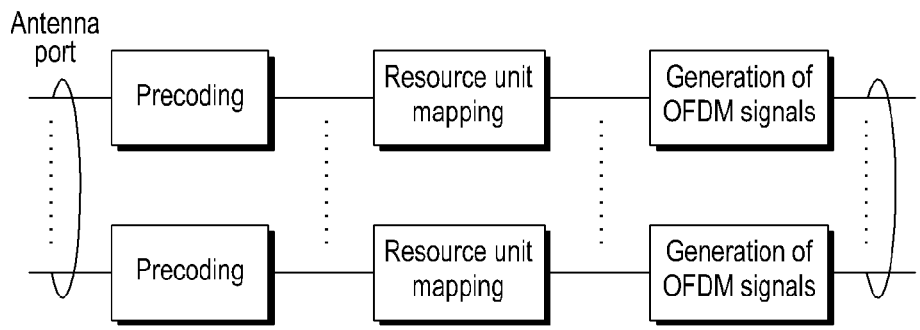

[Fig. 11]
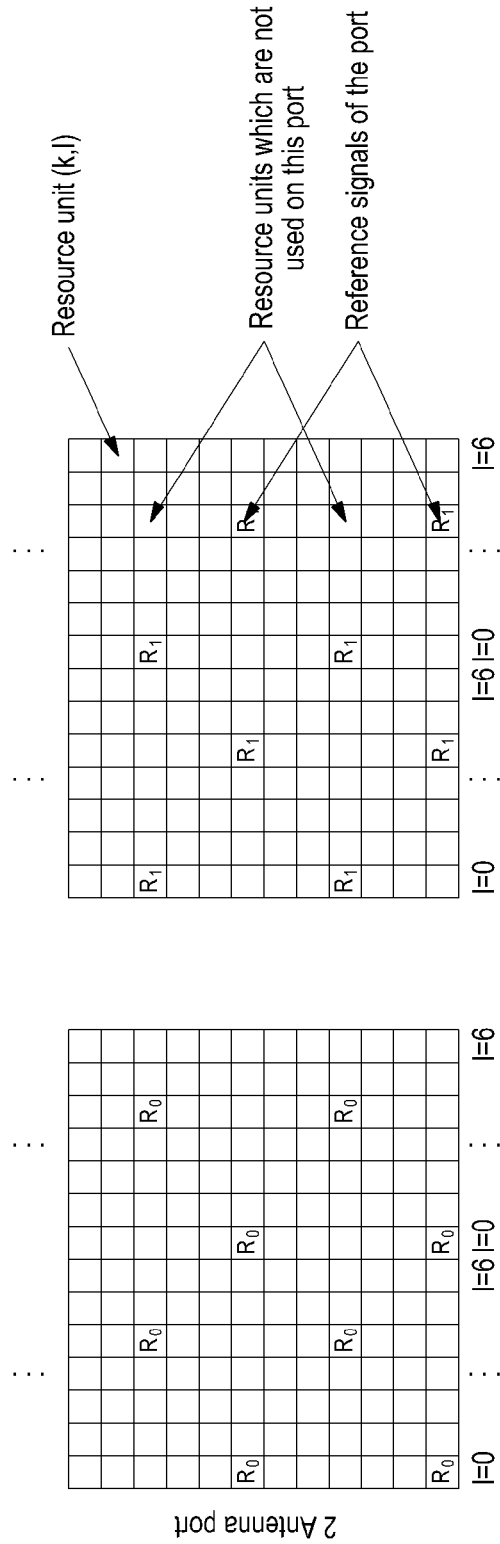

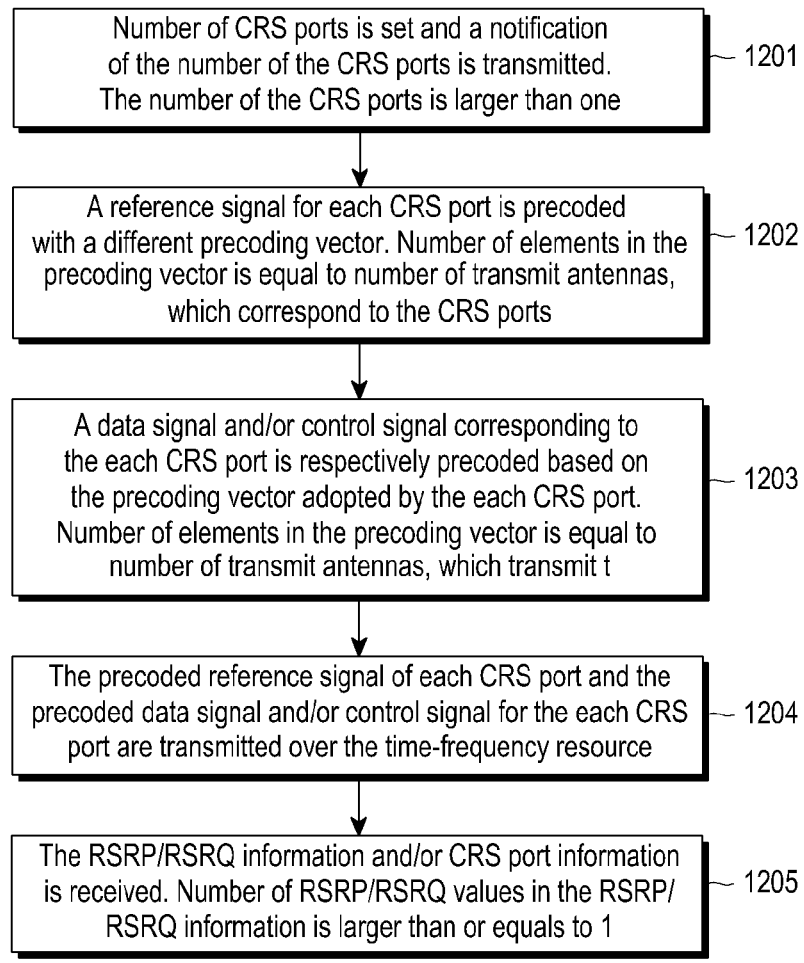

[Fig. 13]
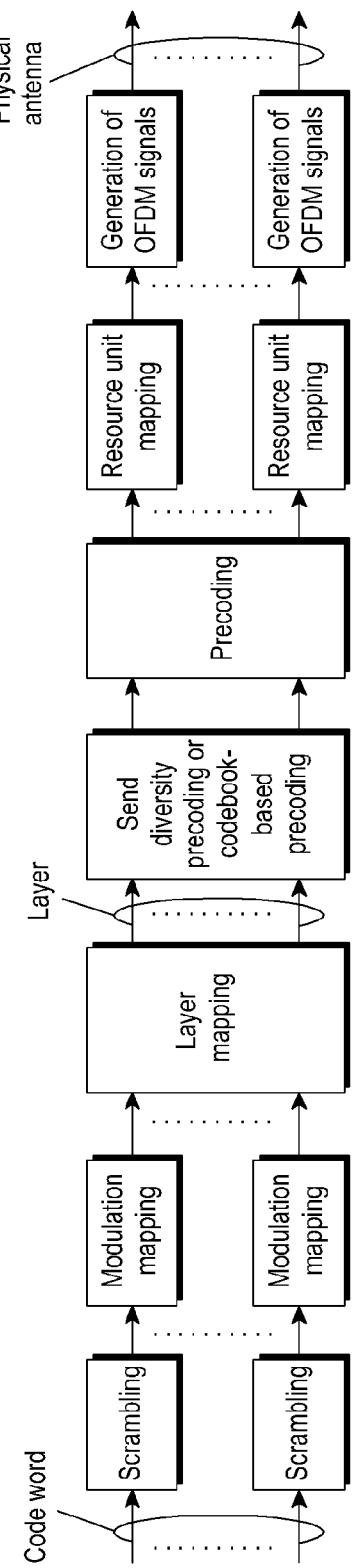

[Fig. 14]
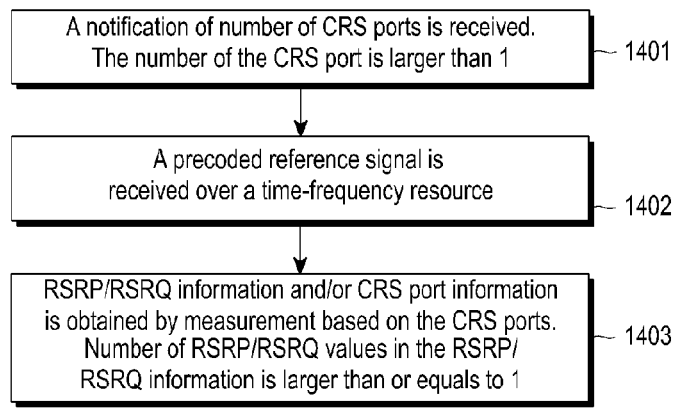
[Fig. 15]
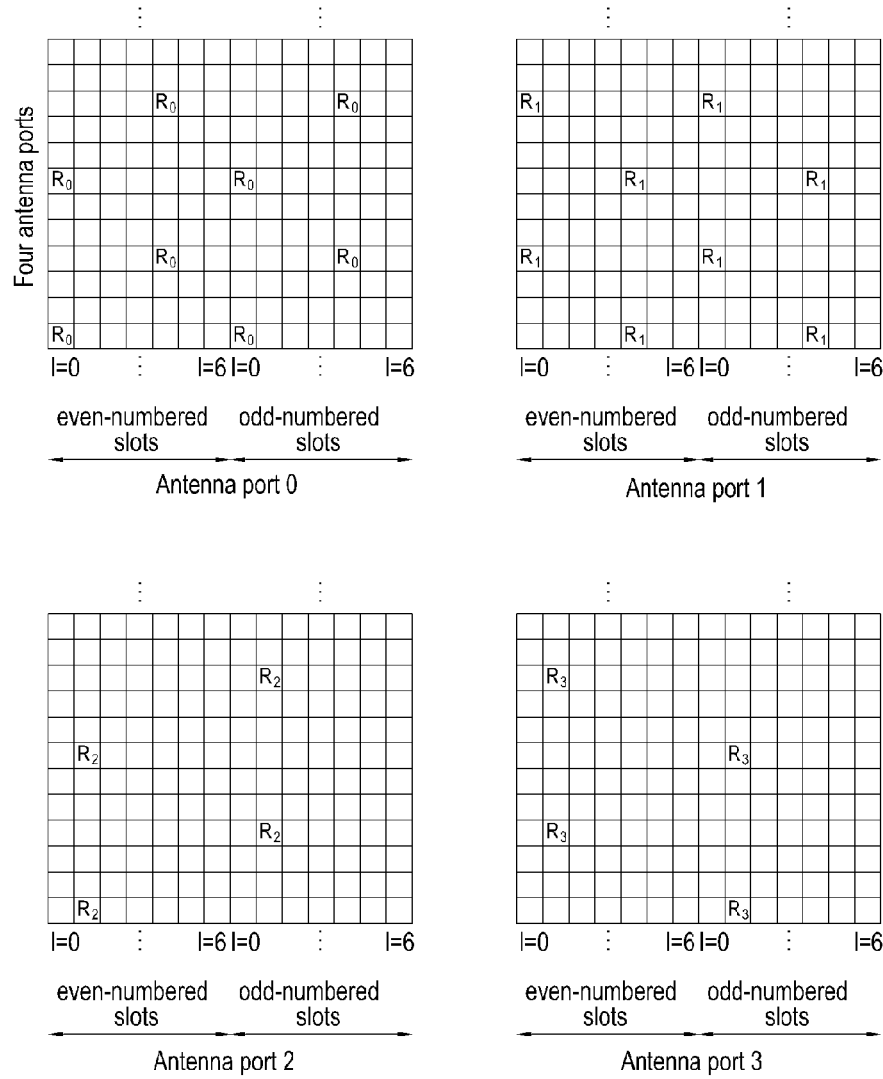

[Fig. 16]
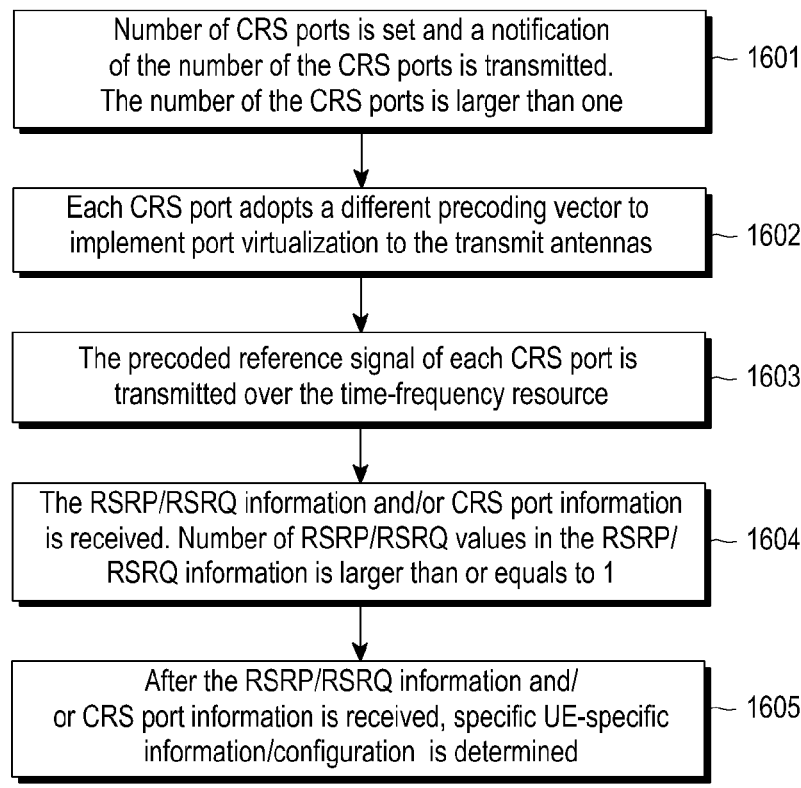
[Fig. 17]
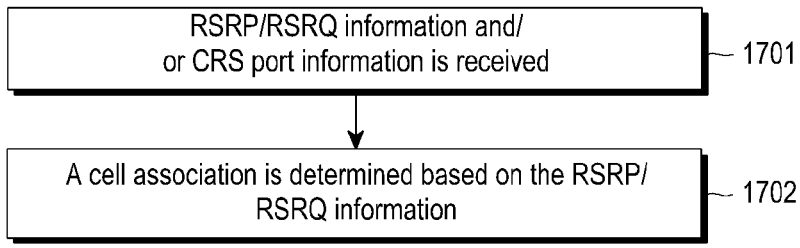
[Fig. 18]
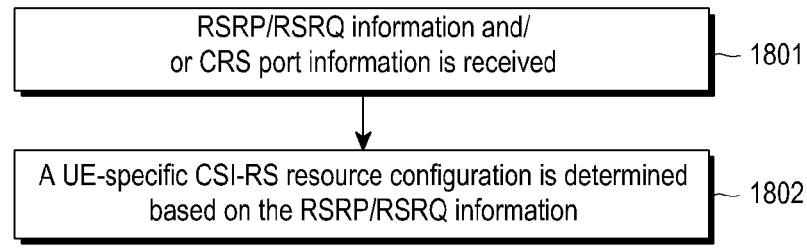

[Fig. 19]
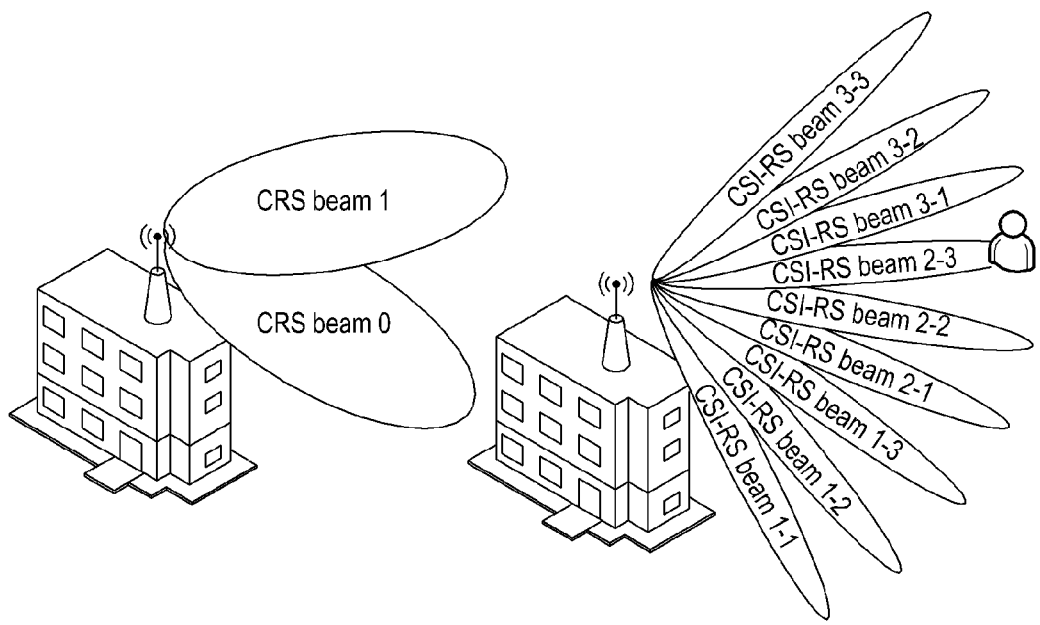
[Fig. 20]
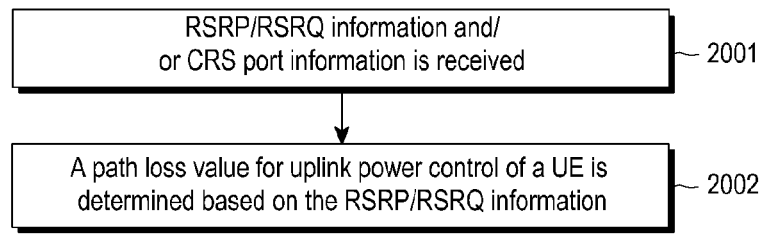

METHOD AND APPARATUS FOR REFERENCE SIGNAL TRANSMITTING AND RECEIVING IN ACTIVE ANTENNA SYSTEMS

PRIORITY

This application is a National Phase Entry of PCT International Application No. PCT/KR2015/006369, which was filed on Jun. 23, 2015, and claims priority to Chinese Patent Application No. 201410282799.8, which was filed on Jun. 23, 2014, the contents of each of which are incorporated herein by reference.

TECHNICAL FIELD

The present disclosure relates to a field of mobile communication systems, and more particularly to a method and apparatus for reference signal transmitting and receiving in active antenna systems.

BACKGROUND ART

In mobile communication systems, the wireless fading channels are time-varying. In order to effectively detect signals, channel information is needed to implement relevant detection. In order to obtain the channel information, the base station transmits the signals or sequences, which are known to the UE, via wireless channels. And the UE obtains the channel information via detecting the known signals or sequences. The known signals or sequences are called pilot signals or reference signals.

A Long Term Evolution/Long Term Evolution-Advanced (LTE/LTE-A) system is a typical correlation detection system. There are seven kinds of pilot signals or reference signals according to the purposes as described below.

A Cell-specific Reference Signal (CRS) is used for data demodulation of PBCH, PDCCH, and some of PDSCHs, measurement of Channel State Information (CSI) of downlink shared channel (PDSCH) of transmission modes 1 to 8.

A Multimedia Broadcast Multicast Service Single Frequency Network Reference Signal (MBSFN-RS) is used for data demodulation of a Multicast Channel (MCH).

A downlink User Equipment-specific Reference Signal (DMRS) is used for data demodulation of PDSCH of transmission modes 7 to 10.

A Channel State Information Reference Signal (CSI-RS) is used for measurement of the CSI for PDSCH of transmission modes 9 to 10.

A Positioning Reference Signal (PRS) is used for performing positioning function.

An uplink Demodulation Reference Signal (DMRS) is used for data demodulation of physical uplink shared channel (PUSCH) and physical uplink control channel (PUCCH).

An uplink Sounding Reference Signal (SRS) is used for measurement of uplink CSI and obtaining downlink channel information via channel reciprocity for TDD systems.

Besides CSI measurement, data demodulation and synchronization assistance, the CRS is further used for measurement of Reference Signal Receive Power (RSRP/RSRQ) to implement path loss estimation, cell association, etc.

Reference signal received power (RSRP/RSRQ), is defined as the linear average over the power contributions (in [W]) of the resource elements that carry cell-specific reference signals within the considered measurement frequency bandwidth.

For RSRP/RSRQ determination the cell-specific reference signals R0 according to TS 36.211 shall be used. If the UE can reliably detect that R1 is available it may use R1 in addition to R0 to determine RSRP/RSRQ, where R0 and R1 are reference signal of CRS port 0 and port 1, respectively.

Reference Signal Received Quality (RSRQ) is defined as the ratio K×RSRP/RSRQ/(E-UTRA carrier RSSI), where K is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over K number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

An antenna port is defined such that the channel over which a symbol on the antenna port is conveyed can be inferred from the channel over which another symbol on the same antenna port is conveyed. There is not necessarily a one-to-one relationship between the antenna port and physical antenna. The signal of each antenna port may be transmitted by combining signals over one antenna or multiple antennas. This process is called port virtualization.

With development of antenna technologies, particularly active antenna array technologies, physical antenna elements are not only distributed in a horizontal dimension, but also distributed in both the vertical dimension and the horizontal dimension to form a 2-Dimension (2-D) antenna array. As shown in FIG. 1 and FIG. 2, FIG. 1 is a schematic diagram illustrating structure of an active antenna cross-polarized 2-D antenna array in accordance with an embodiment of the prior art. FIG. 2 is a schematic diagram illustrating structure of a co-polarized 2-D antenna array in accordance with an embodiment of the prior art. N is the number of antennas in a horizontal co-polarized direction and M is the number of antennas in the vertical dimension.

Using the 2-D antenna array, the vertical beamforming and/or dynamic vertical sectorization is possible. Narrow beams, which directly point to the UE or avoid interfere to the UE using the same time frequency resource, are generated in the vertical dimension via multiplexing different weighting factor to each antenna. Therefore, the received signal power may be improved or the interference to the other UEs using the same time frequency resources may be avoided.

At present, although the LTE/LTE-A system supports that different reference signals may adopt different port virtualization methods, in the LTE/LTE-A specification, only passive antenna array is only taken into consideration in standardization process, the characteristics of the active antenna array are not taken into consideration.

For the convenience of description, the wireless communication system with the active antenna array is called an active antenna system hereinafter. In order to obtain a vertical beamforming gain, a UE-specific vertical beamforming technology may be adopted for PDSCH. In order to ensure that UE in anywhere of a cell can receive the CRS, a cell-specific vertical beamforming vector may be adopted in the vertical dimension. In this way, the transmission of the CRS and transmission of data, which is measured based on the CSI-RS or demodulated based on the DMRSDMRS, may have different beamforming gains in the vertical dimension, resulting in different received signal strength. FIG. 3 is a diagram illustrating that the CRS and the PDSCH, which is measured based on the CSI-RS or demodulated based on the DMRS, adopt different vertical beamforming in accordance with an embodiment in the prior art.

In LTE/LTE-A systems, cell association is implemented based on a Reference Signal Receiving Power RSRP/RSRQ value reported measured based on CRS port 0. Since the CRS and PDSCH, which is measured based on the CSI-RS or demodulated based on the DMRS, are transmitted with different vertical beamforming technologies, the cell association may be not suitable for PDSCH, which is measured based on the CSI-RS or demodulated based on the DMRS.

FIG. 4 is a diagram illustrating the transmission of the CRS in accordance with an embodiment in the prior art. As shown in FIG. 4, the CRS is virtualized with a fixed vertical beamforming vector. Generally, in order to control interference to the adjacent cells, a down-tilt angle may be to be formed. For instance, in the typical Urban Marco (UMa) scenario, the base station (BS) antenna height is 25 m, and the inter-site distance is 500 m. The UEs are distributed outdoor or in low buildings with height of 18~24 m. The 90 degree represents the horizontal direction, the 0 degree represents vertically pointing to the sky, and the 180 degree presents vertically pointing to the ground. Then, electronic down-tilt of CRS is 102 degree. In that case, the CRS vertical antenna array gain received by the UE is much small if the UE antenna height is larger than or equal to the BS antenna height. The signal strength of the CRS received by the UE is relatively weak no matter of accessing which cell. The CRS receiving for these UEs are in deep spatial fading.

On the other hand, the RSRP/RSRQ value measured based on the CRS port 0 is used to estimate the path loss value for the uplink power control. Inappropriate RSRP/RSRQ report may affect performance of the uplink control in the active antenna systems. In LTE/LTE-A standardization with passive antennas, it is assumed that the uplink path loss and downlink path loss is approximately symmetrical. This is because in the passive antenna system, the uplink channel and downlink channel may experience the same large-scale fading and similar antenna array gain. However, in the active antenna systems adopting the vertical beamforming, if the CRS adopts the fixed vertical beamforming, while the Maximal Ratio Combining (MRC) detection is used in the uplink receiving, the antenna gains for the uplink and downlink are asymmetric. Therefore, the downlink path loss estimated with the RSRP/RSRQ value is significantly different from the actual uplink path loss and the uplink power control performance may be further affected.

DISCLOSURE OF INVENTION

Technical Problem

In view of the above, embodiments of the present disclosure provide reference signal transmitting and receiving methods in the active antenna systems. With these methods, the coverage problem of CRS signal and physical broadcast channel (PBCH)/physical downlink control channel (PDCCH)/physical downlink shared channel (PDSCH) demodulated based on CRS and the problem of measurement for radio resource management (RRM) in the active antenna systems may be avoided.

Embodiments of the present disclosure further provide reference signal transmitting and receiving devices in the active antenna system. With these devices, the coverage problem of CRS signal and physical broadcast channel (PBCH)/physical downlink control channel (PDCCH)/physical downlink shared channel (PDSCH) demodulated based on CRS and the problem of measurement for radio resource management (RRM) in the active antenna systems may be avoided.

Solution to Problem

According to the above objectives, the present disclosure is implemented as follows.

A reference signal transmitting method in an active antenna system includes:

setting number of Cell-specific Reference Signal (CRS) ports and transmitting a notification of number of the CRS ports, wherein the number of the CRS ports is larger than 1;

precoding a reference signal with a different precoding vector for each of the CRS ports, wherein number of elements in the precoding vector is equal to number of transmit antennas, which correspond to the CRS ports; and transmitting the precoded reference signal for the each of the CRS ports over a corresponding frequency-time resource.

A reference signal receiving method in an active antenna system includes:

receiving a notification of number of Cell-specific Reference Signal (CRS) ports, wherein the number of the CRS ports is larger than 1; and receiving a reference signal over a time-frequency resource.

A reference signal transmitting device in an active antenna system includes:

a notification module, to set number of Cell-specific Reference Signal (CRS) ports and transmit a notification of number of the CRS ports, wherein the number of the CRS ports is larger than 1;

a precoding module, to precode a reference signal with a different precoding vector for each of the CRS ports, wherein number of elements in the precoding vector is equal to number of transmit antennas, which correspond to the CRS ports; and a transmitting module, to transmit the precoded reference signal for the each of the CRS ports over a corresponding frequency-time resource.

A reference signal receiving device in an active antenna system includes:

a signaling receiving module, to receive a notification of number of Cell-specific Reference Signal (CRS) ports, wherein the number of the CRS ports is larger than 1; and a signal receiving module, to receive a reference signal over a time-frequency resource.

It can be seen from the above technical scheme that embodiments of the present disclosure implement port virtualization to transmit antennas via using multiple CRS antenna ports and applying different vertical beamforming vectors to the different CRS antenna ports. When the UE reports the RSRP/RSRQ value, the UE simultaneously reports the information of the CRS antenna ports. Therefore, the problems of unsatisfactory CRS signal coverage and RSRP/RSRQ report in the active antenna system may be solved. Specifically, following problems may be solved. 1) Differences between transmission signal coverage of the CRS and transmission signal coverage of data, which is measured based on the CSI-RS or demodulated based on the DMRS may be reduced or avoided. 2) The problem that differences between the vertical beamforming technologies adopted by the CSI-RS or DMRS and that adopted by the CRS make it inappropriate for the UE to access a cell may be avoided. 3) It may be avoided that when the UE with a specific-height antenna receives the data signal and/or control signal, which are demodulated based on the CRS, the vertical antenna array gain is in a deep spatial fading state.

BRIEF DESCRIPTION OF DRAWINGS

FIG. 1 is a schematic diagram illustrating structure of an active cross-polarized 2-D antenna array in accordance with an embodiment of the prior art;

FIG. 2 is a schematic diagram illustrating structure of a co-polarized 2-D antenna array in accordance with an embodiment of the prior art;

FIG. 3 is a diagram illustrating that the CRS and the PDSCH, which is measured based on the CSI-RS or demodulated based on the DMRS, adopt different vertical beamforming for port virtualization in accordance with an embodiment in the prior art;

FIG. 4 is a diagram illustrating the transmission of the CRS in accordance with an embodiment in the prior art;

FIG. 5 is a flow chart illustrating a reference signal transmitting method in an active antenna system in accordance with an embodiment of the present disclosure;

FIG. 6 is a flow chart illustrating a reference signal receiving method in an active antenna system in accordance with an embodiment of the present disclosure;

FIG. 7 is a schematic diagram illustrating structure of a reference signal transmitting device in an active antenna system in accordance with an embodiment of the present disclosure;

FIG. 8 is a schematic diagram illustrating structure of a reference signal receiving device in an active antenna system in accordance with an embodiment of the present disclosure;

FIG. 9 is a flow chart illustrating a reference signal transmitting method in an active antenna system in accordance with a first embodiment of the present disclosure;

FIG. 10 is a schematic diagram illustrating a CRS transmitting process in the physical layer in accordance with a first embodiment of the present disclosure;

FIG. 11 is a diagram illustrating a CRS time-frequency resource pattern in accordance with a first embodiment of the present disclosure;

FIG. 12 is a flow chart illustrating a reference signal transmitting method in an active antenna system in accordance with a second embodiment of the present disclosure;

FIG. 13 is a diagram illustrating the process of PBCH/PDCCH/PDSCH, which is demodulated based on a CRS, in accordance with a second embodiment of the present disclosure;

FIG. 14 is a flow chart illustrating a reference signal receiving method in an active antenna system in accordance with a third embodiment of the present disclosure;

FIG. 15 is a diagram illustrating a CRS time-frequency resource pattern in accordance with a third embodiment of the present disclosure;

FIG. 16 is a flow chart illustrating a reference signal transmitting method in an active antenna system in accordance with a fourth embodiment of the present disclosure;

FIG. 17 is a flow chart illustrating a first method for determining specific UE-specific information/configuration in accordance with a fourth embodiment of the present disclosure;

FIG. 18 is a flow chart illustrating a second method for determining the specific UE-specific information/configuration in accordance with a fourth embodiment of the present disclosure;

FIG. 19 is a diagram illustrating determination of UE-specific CSI-RS resource configuration with RSRP/RSRQ values in accordance with a fourth embodiment of the present disclosure; and FIG. 20 is a flow chart illustrating a third method for determining the specific UE-specific information/configuration in accordance with a fourth embodiment of the present disclosure.

MODE FOR THE INVENTION

To make the objective and technical solution of the merits of the present disclosure more apparent, the present disclosure may be described in detail with reference to accompanying Figs.

In the active antenna system, following problems are caused when the reference signal is transmitted or received. 1) Coverage differences between CRS and PBCH/PDCCH/PDSCH demodulated based on CRS transmission and Enhanced PDCCH (E-PDCCH)/PDSCH signal transmission, which is measured based on the CSI-RS or demodulated based on the DMRS may be occurred. 2) Cell association using RSRP/RSRQ measured from CRS may not guarantee the best performance in PDSCH/EPDCCH reception due to different beamforming gains between CRS and PDSCH/EPDCCH/DMRS for port virtualization. 3) A fixed vertical weighted vector is used by CRS while the UE is distributed in a large range of height, which leads to deep spatial fading for some UEs of CRS/PBCH/PDCCH/PDSCH demodulated based on the CRS. Therefore, in order to avoid the above problems, an embodiment of the present disclosure using multiple CRS ports. Port virtualization to transmit antennas may be implemented for multiple Cell-specific Reference Signal (CRS) antenna ports and applying different vertical beamforming vectors to implement port virtualization for the different CRS antenna ports. When the User Equipment (UE) reports the maximum RSRP/RSRQ values measured based on multiple CRS ports, or the UE simultaneously reports multiple RSRP/RSRQ values and the information of the multiple CRS antenna ports.

Further, on the premise that a same channel measurement effect is obtained, the method and device provided by embodiments may reduce the resource of CSI-RS, which are used by the UE to perform CSI measurement, and may reduce the path loss estimation error RSRP/RSRQ for uplink power control.

FIG. 5 is a flow chart illustrating a reference signal transmitting method in an active antenna system in accordance with an embodiment of the present disclosure. The blocks are as follows.

AT block 501, number of CRS ports is set and a notification of the number of the CRS ports is transmitted. The number of the CRS ports is larger than one.

At block 502, a reference signal for each CRS port is precoded with a different precoding vector. Number of elements in the precoding vector is equal to number of transmit antennas, which correspond to the CRS ports.

At block 503, the precoded reference signal for the each CRS port is transmitted over a time-frequency resource.

After block 503, the method further includes:

receiving RSRP/RSRQ information and/or CRS port information. Number of RSRP/RSRQ values in the RSRP/RSRQ information is larger than or equal to 1.

After block 502 and before block 503, the method further includes:

respectively precoding a data signal and/or control signal corresponding to the each CRS port based on the precoding vector adopted by the each CRS port.

When block 503 is performed, the precoded data signal and/or control signal is transmitted over the time-frequency resource.

FIG. 6 is a flow chart illustrating a reference signal receiving method in an active antenna system in accordance with an embodiment of the present disclosure. The blocks are as follows.

At block 601, a notification of number of CRS ports is received. The number of the CRS ports is larger than 1.

At block 602, a precoded reference signal is received over a time-frequency resource.

This method further includes: obtaining RSRP/RSRQ information and/or CRS port information by measurement based on the CRS ports. Number of RSRP/RSRQ values in the RSRP/RSRQ information is larger than 1 or equal to 1.

The method further includes: receiving a precoded data signal and/or control signal over the time-frequency resource.

FIG. 7 is a schematic diagram illustrating structure of a reference signal transmitting device in an active antenna system in accordance with an embodiment of the present disclosure. As shown in FIG. 7, the reference signal transmitting device includes: a notification module, a precoding module and a transmitting module.

The notification module is to set number of CRS ports and transmit a notification of the number of the CRS ports. The number of the CRS ports is larger than 1.

The precoding module is to precode a reference signal with a different precoding vector for each CRS port. Number of elements in the precoding vector is equal to number of transmit antennas, which correspond to the CRS ports.

The transmitting module is to transmit the precoded reference signal for the each CRS port over a time-frequency resource.

The reference signal transmitting device further includes a RSRP/RSRQ receiving module. The RSRP/RSRQ receiving module is to receive RSRP/RSRQ information and/or CRS port information. Number of RSRP/RSRQ values in the RSRP/RSRQ information is larger than or equal to 1.

In this reference signal transmitting device, the precoding module is further to respectively precode a data signal and/or control signal corresponding to each CRS port based on the precoding vector adopted by the each CRS port.

The transmitting module is further to transmit the precoded data signal and/or control over the time-frequency resource.

In this reference signal transmitting device, the RSRP/RSRQ receiving module is further to determine specific UE-specific information/configuration according to the RSRP/RSRQ information and/or CRS port information.

FIG. 8 is a schematic diagram illustrating structure of a reference signal receiving device in an active antenna system in accordance with an embodiment of the present disclosure. As shown in FIG. 8, the reference signal receiving device includes: a signaling receiving module and a signal receiving module.

The signaling receiving module is to receive a notification of number of CRS ports. The number of the CRS port is larger than 1.

The signal receiving module is to receive a precoded reference signal over a time-frequency resource.

The reference signal receiving device further includes: a measurement report module. The measurement report module is to obtain RSRP/RSRQ information and/or CRS port information by measurement based on the CRS ports and transmit the RSRP/RSRQ information and/or CRS port information. Number of RSRP/RSRQ values in the RSRP/RSRQ information is larger than or equal to 1.

In the reference signal receiving device, the signal receiving module is further to receive a precoded data signal and/or control signal over the time-frequency resource.

The present disclosure is described hereinafter in detail with reference to several specific embodiments.

Embodiment One

FIG. 9 is a flow chart illustrating a reference signal transmitting method in an active antenna system in accordance with a first embodiment of the present disclosure. Blocks are as follows.

At block 901, the number of CRS ports is set and a notification of the number of the CRS ports is transmitted. The number of the CRS ports is larger than one.

At this block, the notification of the number of the CRS ports may be performed in an implicit way. Specifically, the notification of the number of the CRS ports is implicitly performed by different Physical Broadcast Channel (PBCH) Cyclic Redundancy Check (CRC) scrambling codes. After the CRC attachment of PBCH, the CRC bits are scrambled according to the eNodeB transmit antenna configuration with the sequence as indicated in Table 1, Thus, the CRS port index can be determined based on CRC mask at the UE side.

TABLE 1

| Number of transmit antenna ports at eNodeB | PBCH CRC mask<$x_{ant,\,0}, x_{ant,\,1}, \ldots, x_{ant,\,15}$> |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

In the active antenna systems, the number of the CRS ports is a positive integer, which is larger than 1. The base station may determine the number of CRS ports considering CRS overheads and the UE distribution of, d and transmit the notification of the number of the CRS ports. For instance, in typical UMa scenarios, the BS antenna height of a base station antenna is 25 m. The inter-site distance is 500 m. The UEs are distributed outdoor or distributed in low buildings with height of 18-24 m. All vertical leaving angles of the UE are larger than 90 degree (The 90 degree represents a horizontal direction. The 0 degree represents vertically pointing to the sky. The 180 degree presents vertically pointing to the ground). Considering the CRS overhead and UE distribution, the number of the CRS ports may be set as 2.

At block 902, a reference signal for each CRS port is precoded with a different precoding vector. Number of elements in the precoding vector is equal to number of transmit antennas, which correspond to the CRS ports.

At this block, the CRS port adopts a different precoding vector to implement port virtualization to transmit antennas. FIG. 10 is a schematic diagram illustrating a CRS transmitting process in the physical layer in accordance with a first embodiment of the present disclosure. The port virtualization to transmit antennas refers to precoding the reference signal for the CRS port with a precoding vector. The number of elements in the precoding vector is equal to the number of transmit antennas, which transmitting the same CRS.

Take the typical UMa for example, assuming a physical antenna configuration is cross-polarized 2-D antenna array, M=10 and N=1. Both the two polarization directions include M antenna groups distributed in the vertical dimension, i.e. antenna group 0 and antenna group 1. Suppose the distance between two transmit antennas is half-wavelength. The virtualization from signals of CRS port 0 to the antenna group 0 is implemented via the precoding vector $W_0 = [w_0^{(0)} w_1^{(0)} \ldots w_{M-1}^{(0)}]^T$. The virtualization from signals of CRS port 1 to the antenna group 1 is implemented via the $$W_1 = [w_0^{(1)} w_1^{(1)} \ldots w_{M-1}^{(1)}]^T \cdot w_m^{(p)} = \frac{1}{\sqrt{M}} \exp\left(-j\frac{2\Pi}{\lambda} m \cdot d_v \cdot \cos\theta_p\right),$$

$d_v$ denotes the distance between the vertical antennas, p denotes the index of CRS port, m denotes the m-th element of the precoding vectors, $\theta_p$ denotes the down-tilt angle corresponding to the p-th port. For instance, the electronic down-tilt angle corresponding to the port 0 is 102 degree, and the electronic down-tilt angle corresponding to port 1 is 95 degree.

At block 903, the precoded reference signal for each CRS port is transmitted over the time-frequency resource.

At this block, FIG. 11 is a diagram illustrating a CRS time-frequency resource pattern in accordance with a first embodiment of the present disclosure.

At block 904, RSRP/RSRQ information and/or CRS port information is received. Number of RSRP/RSRQ values in the RSRP/RSRQ information is larger than or equal to 1.

At this block, the RSRP/RSRQ information and/or CRS port information may be an RSRP/RSRQ value measured by a CRS port with the maximum receiving power and the corresponding CRS port index. As shown in table 2, the reporting range of RSRP/RSRQ is defined from −140 dBm to −44 dBm with 1 dB resolution. The mapping of measured quantity and CRS port index may be mapped in Table 2. 4 RSRP/RSRQ states indicating the number of the CRS antenna ports may be reported RSRP/RSRQ simultaneously with RSRP/RSRQ value.

TABLE 2

| Reported value | Measured quantity value | Unit |
| --- | --- | --- |
| RSRP/RSRQ_00 | RSRP/RSRQ −140 | dBm |
| RSRP/RSRQ_01 | −140 ≤ RSRP/RSRQ < −139 | dBm |
| RSRP/RSRQ_02 | −139 ≤ RSRP/RSRQ < −138 | dBm |
| ... | ... | ... |
| RSRP/RSRQ_95 | −46 ≤ RSRP/RSRQ < −45 | dBm |
| RSRP/RSRQ_96 | −45 ≤ RSRP/RSRQ < −44 | dBm |
| RSRP/RSRQ_97 | −44 ≤ RSRP/RSRQ | dBm |
| RSRP/RSRQ_98 | Port 0 | |
| RSRP/RSRQ_99 | Port 1 | |
| RSRP/RSRQ_100 | Port 2 | |
| RSRP/RSRQ_101 | Port 3 | |

As shown in table 3, the RSRP/RSRQ information and/or CRS port information may further be the RSRP/RSRQ value measured by the port.

TABLE 3

| Reported value | Measured quantity value | Unit |
| --- | --- | --- |
| RSRP/RSRQ_00 | Port 0 RSRP/RSRQ < −140 | dBm |
| RSRP/RSRQ_01 | Port 0 −140 ≤ RSRP/RSRQ < −139 | dBm |
| RSRP/RSRQ_02 | Port 0 −139 ≤ RSRP/RSRQ < −138 | dBm |
| ... | ... | ... |
| RSRP/RSRQ_95 | Port 0 −46 ≤ RSRP/RSRQ < −45 | dBm |
| RSRP/RSRQ_96 | Port 0 −45 ≤ RSRP/RSRQ < −44 | dBm |
| RSRP/RSRQ_97 | Port 0 −44 ≤ RSRP/RSRQ | dBm |
| RSRP/RSRQ_98 | Port 1 RSRP/RSRQ < −140 | dBm |
| RSRP/RSRQ_99 | Port 1 −140 ≤ RSRP/RSRQ < −139 | dBm |
| RSRP/RSRQ_100 | Port 1 −139 ≤ RSRP/RSRQ < −138 | dBm |
| ... | ... | ... |
| RSRP/RSRQ_183 | Port 1 −46 ≤ RSRP/RSRQ < −45 | dBm |
| RSRP/RSRQ_184 | Port 1 −45 ≤ RSRP/RSRQ < −44 | dBm |
| RSRP/RSRQ_185 | Port 1 −44 ≤ RSRP/RSRQ | dBm |
| ... | ... | ... |

The RSRP/RSRQ information and/or CRS port information may further be the RSRP/RSRQ value measured by the CRS port 0 or a relative RSRP/RSRQ value of another port to that of the CRS port 0.

The RSRP/RSRQ information and/or CRS port information may further be the RSRP/RSRQ values measured by K CRS ports. K is larger than 1 and less than total number of the CRS antenna ports. Corresponding antenna port index is also reported.

With the above processing, since different CRS ports adopt different vertical beamforming, UE which is not covered by the beam of the CRS port 0, may be covered by the beam of another CRS port. Therefore, it may be reduced or avoided that when the terminal with the specific-height antenna receives the CRS, the vertical antenna gain remains at the deep spatial fading state for a long time of given UE.

In this embodiment, the received RSRP/RSRQ information and/or CRS port information provides not only the information of the RSRP/RSRQ value measured based on the CRS port with the maximum receiving power, but also the port information corresponding to the RSRP/RSRQ value measured based on the CRS port with the maximum receiving power. The BS may implement subsequent optimization for PBCH/PDCCH/PDSCH transmission, cell association, uplink power control, etc. with the above information.

Embodiment Two

FIG. 12 is a flow chart illustrating a reference signal transmitting method in an active antenna system in accordance with a second embodiment of the present disclosure. Specific blocks are as follows.

At block 1201, number of CRS ports is set and a notification of the number of the CRS ports is transmitted. The number of the CRS ports is larger than one.

At block 1202, a reference signal for each CRS port is precoded with a different precoding vector. Number of elements in the precoding vector is equal to number of transmit antennas, which correspond to the CRS ports.

At block 1203, a data signal and/or control signal corresponding to the each CRS port is respectively precoded based on the precoding vector adopted by the each CRS port. Number of elements in the precoding vector is equal to number of transmit antennas, which transmit the data signal and/or control signal.

At this block, port virtualization to transmit antenna processing is performed for PBCH/PDCCH/PDSCH, which is demodulated based on the CRS, using the precoding vectors corresponding to the CRS ports. The physical layer processing process of PBCH/PDCCH/PDSCH, which is demodulated based on the CRS, is shown in FIG. 13. FIG. 13 is a diagram illustrating a physical layer processing of PBCH/PDCCH/PDSCH, which is demodulated based on CRS, in accordance with the second embodiment of the present disclosure. For instance, the CRS of port 0 adopts the precoding vector W0 to implement the port virtualization to transmit antennas. The PBCH/PDCCH/PDSCH over port 0 also implements the port virtualization to transmit antennas with the same precoding vector. Other ports adopt similar processing.

At block 1204, the precoded reference signal for the each CRS port and the precoded data signal and/or control signal for the each CRS port are transmitted over the time-frequency resource.

At block 1205, the RSRP/RSRQ information and/or CRS port information is received. Number of RSRP/RSRQ values in the RSRP/RSRQ information is larger than or equal to 1.

With the method shown in FIG. 12, since the reference signal and PBCH/PDCCH/PDSCH, which is demodulated based on the CRS of each CRS port adopt different vertical beamforming, UE, which is not covered by the beam of the CRS port 0, may be covered by the beam of another CRS ports. Therefore, it may be reduced or avoided that the deep spatial fading problem may be reduced or avoided. Thus, the coverage of PBCH/PDCCH/PDSCH, which is demodulated based on the CRS, is improved.

Embodiment Three

FIG. 14 is a flow chart illustrating a reference signal receiving method in an active antenna system in accordance with a third embodiment of the present disclosure. Specific blocks are as follows.

At block 1401, a notification of number of CRS ports is received. The number of the CRS port is larger than 1.

At this block, the number of antenna ports may be determined according to PBCH scrambling mask via decoding the signals of the PBCH over the CRS port 0.

At block 1402, a precoded reference signal is received over a time-frequency resource.

As exclusively used at this block, the precoded reference signal may be received according to the CRS time-frequency resource pattern shown in FIG. 15. FIG. 15 is a diagram illustrating a CRS time-frequency resource pattern in accordance with a third embodiment of the present disclosure.

At block 1403, RSRP/RSRQ information and/or CRS port information is obtained by measurement based on the CRS ports. Number of RSRP/RSRQ values in the RSRP/RSRQ information is larger than or equal to 1.

At this block, the RSRP/RSRQ value measured based on the CRS port with maximum receiving power and the corresponding CRS antenna port index may be reported. For instance, as shown in table 2, four states indicating the CRS antenna port index are reported during the report of the RSRP/RSRQ value. Alternatively, as shown in table 3, the RSRP/RSRQ value of the each port is reported at the same time. Alternatively, the RSRP/RSRQ value of the CRS port 0 and a relative RSRP/RSRQ value of another port to that of the CRS port 0 are reported. Alternatively, the RSRP/RSRQ values of N CRS ports and corresponding antenna port number information are reported. N is larger than 1 and less than total number of the CRS antenna ports.

With the above processing, the base station may obtain more RSRP/RSRQ information of the CRS port, which is convenient for the network side to make further processing to obtain the corresponding gain.

Embodiment Four

FIG. 16 is a flow chart illustrating a reference signal transmitting method in an active antenna system in accordance with a fourth embodiment of the present disclosure. Specific blocks are as follows.

At block 1601, number of CRS ports is set and a notification of the number of the CRS ports is transmitted. The number of the CRS ports is larger than one.

At this block, in typical UMa scenarios, the BS antenna height is 10 m. The inter-site distance is 200 m. The UEs are distributed outdoor or distributed in low buildings with the height of 18-24 m. Taking account of that vertical leaving angles of the UEs are in a large range and taking account of factors, such CRS overhead influence, the number of the CRS ports is set as 4.

At block 1602, each CRS port adopts a different precoding vector to implement port virtualization to transmit antennas.

At this block, four different precoding vectors are adopted to implement the port virtualization to transmit antennas of four CRS ports. The virtualization of the CRS port 0 to the antenna group 0 is implemented via the precoding vector $W_0 = [w_0^{(0)} w_1^{(0)} \ldots w_{M-1}^{(0)}]^T$. The virtualization of the CRS port 1 to the antenna group 1 is implemented via the precoding vector $$W_1 = [w_0^{(1)} w_1^{(1)} \ldots w_{M-1}^{(1)}]^T \cdot w_m^{(p)} = \frac{1}{\sqrt{M}} \exp\left(-j\frac{2\Pi}{\lambda} m \cdot d_v \cdot \cos\theta_p\right),$$

dv denotes the distance between the vertical antennas, p denotes the index of the CRS port, m denotes the m-th element of the precoding vectors, $\theta_p$ denotes a down-tilt angle corresponding to the p-th port. The down-tilt angle corresponding to the port 0 is 102 degree, the downward inclination angle corresponding to the port 1 is 95 degree, the down-tilt angle corresponding to the port 2 is 85 degree, the down-tilt angle corresponding to the port 3 is 75 degree.

At block 1603, the precoded reference signal of each CRS port is transmitted over the time-frequency resource.

At block 1604, the RSRP/RSRQ information and/or CRS port information is received. Number of RSRP/RSRQ values in the RSRP/RSRQ information is larger than or equal to 1.

At this block, the RSRP/RSRQ information may be the RSRP/RSRQ value measured by the CRS port with the maximum receiving power. The corresponding port information is the CRS port index corresponding to the RSRP/RSRQ value of measured by the CRS port with the maximum receiving power. The RSRP/RSRQ information may include the RSRP/RSRQ value of the each CRS port. The RSRP/RSRQ information may include the RSRP/RSRQ values of partial CRS ports and the number index information of the partial CRS ports.

At block 1605, after the RSRP/RSRQ information and/or CRS port information is received, specific UE-specific information/configuration is determined.

At this block, the specific UE-specific information/configuration includes: one or combination of information of cell association, a path loss value for uplink power control and/or UE-specific CSI-RS resource configuration.

Specifically speaking, FIG. 17 is a flow chart illustrating a first method for determining UE-specific information/configuration in accordance with a fourth embodiment of the present disclosure. Following blocks are included.

At block 1701, RSRP/RSRQ information and/or CRS port information is received.

At block 1702, a cell association is determined based on the RSRP/RSRQ information.

At this block, each CRS port adopts a different vertical beam. The RSRP/RSRQ information includes the vertical beamforming gain of the best direction. Therefore, the difference between the RSRP/RSRQ and the beamforming gain of the CSI-RS and DMRS after the UE-specific vertical beamforming adopted is relatively reduced. Therefore, the selected cell is more suitable for the PDSCH/E-PDCCH transmission of the UE.

FIG. 18 is a flow chart illustrating a second method for determining the specific UE-specific information/configuration in accordance with a fourth embodiment of the present disclosure. Following blocks are included.

At block 1801, RSRP/RSRQ information and/or CRS port information is received.

At block 1802, a UE-specific CSI-RS resource configuration is determined based on the RSRP/RSRQ information.

At this block, the UE-specific CSI-RS resource configuration is determined based on the correlation of beamforming vectors used for the CSI-RS resources port virtualization and the CRS ports virtualization, RSRP/RSRQ information and CRS port information. The CSI-RS resources in the active antenna system are grouped according to the correlation of the vertical beamforming vectors used for CSI-RS port virtualization and CRS port virtualization. After the RSRP/RSRQ information and/or CRS port information is received, the CSI-RS resources in the CSI-RS resource group corresponding to the CRS port with RSRP/RSRQ value measured with the maximum receiving power, may be determined as the UE-specific CSI-RS resource configuration. Alternatively, CSI-RS resources in CSI-RS resource groups corresponding to the two CRS ports with the RSRP/RSRQ values with the maximum receiving power and second maximum receiving power may be determined as the UE-specific CSI-RS resource configurations.

A specific example is given hereinafter for illustration, suppose two CRS ports adopt two different vertical beams. In the transmission mode using the CSI-RS measurement and DMRS demodulation, such as transmission mode 10 of LTE/LTE-A, the UE-specific vertical beamforming may be implemented via configuring multiple CSI-RS resources and multiple CSI processes for the UE. FIG. 19 is a diagram illustrating determination of UE-specific CSI-RS resource configuration with RSRP/RSRQ reporting in accordance with a fourth embodiment of the present disclosure. As shown in FIG. 19, 9 CSI-RS resources are conFig.d in the active antenna systems. Each CSI-RS resource adopts different vertical beams to perform the beamforming. The 9 CSI-RS resources are divided into three groups. Each group includes 3 CSI-RS resources and the 3 CSI-RS resources adopt adjacent vertical beams to implement port virtualization to transmit antennas. The coverage of the first group of CSI-RS vertical beams in the vertical dimension is close to that of the CRS beam 0. The coverage of the third group of CSI-RS vertical beams in the vertical dimension is close to that of the CRS beam 1. And the coverage of the second group of CSI-RS vertical beams in the vertical dimension is between that of two CRS beams.

If the RSRP/RSRQ CRS port with largest RSRP/RSRQ value is CRS port 0, the first group of CSI-RS resources is allocated to the UE. If the reported port with the largest RSRP/RSRQ value is port 01, the third group of CSI-RS resources is allocated to the UE. If the reported two ports, the RSRP/RSRQ values of which are close to each other, the second group of CSI-RS resources are allocated to the UE.

The UE performs feedback of three CSI processes based three conFig.d CSI-RS resources in one group, such as CSI-RS resource 2-1, CSI-RS resource 2-2 and CSI-RS resource 2-3 in the second group. The base station selects the best vertical beamforming direction based on CSI feedback. For instance, the vertical beamforming direction corresponding to the CSI-RS resource 2-3 is taken as the beamforming direction used by the UE in the data transmission.

In the above second embodiment, apparently, if the CRS port information is not reported, the UE needs to measure 9 different CSI-RS configurations to select the best beam from the nine vertical beams and simultaneously complete nine CSI report processes. Using the RSRP/RSRQ and CRS port information report, the best beam may be selected from the nine vertical beams via measuring only three CSI-RS configurations and completing three CSI report processes.

FIG. 20 is a flow chart illustrating a method for determining the specific UE-specific information/configuration in accordance with a fourth embodiment of the present disclosure. Following blocks are included.

At block 2001, RSRP/RSRQ information and/or CRS port information is received.

At block 2002, the path loss value for uplink power control of a UE is determined based on the RSRP/RSRQ information.

At this block, each CRS port adopts a different vertical beam. The RSRP/RSRQ information is measured based on the vertical beamforming in the best direction. Therefore, the difference between the RSRP/RSRQ value and an uplink antenna array gain of receiver is relatively reduced. Therefore, the difference between the path loss estimation based on the RSRP/RSRQ and the uplink actual path loss is reduced and thus the uplink power control performance is improved.

It can be seen from the methods and devices provided by embodiments of the present disclosure, coverage differences between CRS and PBCH/PDCCH/PDSCH demodulated based on CRS transmission and Enhanced PDCCH (E-PDCCH)/PDSCH signal transmission, which is measured based on the CSI-RS or demodulated based on the DMRS may be reduced or avoided. The cell association problem due to the different vertical beamforming technologies adopted by the CSI-RS or DMRS and by the CRS may be avoided. Deep spatial fading state may be avoided for CRS reception and PBCH/PDCCH/PDSCH demodulated based CRS. On the premise that a same channel measurement effect is obtained, embodiments of the present disclosure may reduce the number of CSI-RS configurations, which are used by the UE to perform channel estimation. Embodiments of the present disclosure may reduce the differences between the path loss of RSRP/RSRQ value estimation and the uplink actual path loss and may improve the uplink power control performance.

The foregoing description only describes preferred embodiments of the present invention and may not be used for limiting the protection scope thereof. Any modification, equivalent substitution, or improvement made without departing from the spirit and principle of the present invention should be covered by the protection scope of the present invention.

The invention claimed is:

1. A reference signal transmitting method in an active antenna system, comprising:
    setting number of Cell-specific Reference Signal (CRS) ports and transmitting a notification of number of the CRS ports, wherein the number of the CRS ports is larger than 1;
    precoding a reference signal with a different precoding vector for each of the CRS ports, wherein number of elements in the precoding vector is equal to number of transmit antennas, which correspond to the CRS ports; and
    transmitting the precoded reference signal for the each of the CRS ports over a corresponding frequency-time resource.

2. The transmitting method according to claim 1, further comprising:
   receiving Reference Signal Receive Power (RSRP)/Reference Signal Received Quality (RSRQ) information and/or CRS port information;
   wherein number of RSRP/RSRQ values in the RSRP/RSRQ information is larger than or equal to 1.

3. The transmitting method according to claim 2, wherein the RSRP/RSRQ information and/or CRS port information comprises:
   an RSRP/RSRQ value measured by a CRS port with the maximum receiving power and a corresponding CRS port index; or
   RSRP/RSRQ values measured by the CRS ports; or
   an RSRP/RSRQ value measured by CRS port 0 and a relative RSRP/RSRQ value of another port to that of the CRS port 0; or
   RSRP/RSRQ values measured by N CRS ports and corresponding CRS port indexes, N is larger than 1 and less than total number of the CRS ports.

4. The transmitting method according to claim 2, further comprising:
   determining specific UE-specific information/configuration according to the RSRP/RSRQ information and/or the CRS port information.

5. The transmitting method according to claim 4, wherein the specific UE-specific information/configuration comprises one or any combination of: information of cell association, a path loss value for uplink power control and Channel State Information Reference Signal (CSI-RS) resource configuration.

6. The transmitting method according to claim 5, wherein when the specific UE-specific information/configuration is the information of cell association, determining the specific UE-specific information/configuration according to the RSRP/RSRQ information and/or the CRS port information comprises:
   determining the cell association according to an RSRP/RSRQ value measured by the CRS port with maximum receiving power.

7. The transmitting method according to claim 5, when the specific UE-specific information/configuration is the path loss value for uplink power control, determining the specific UE-specific information/configuration according to the RSRP/RSRQ information and/or the CRS port information comprises:
   determining the path loss value for uplink power control based on an RSRP/RSRQ value measured by the CRS port with the maximum receiving power.

8. The transmitting method according to claim 5, when the specific UE-specific information/configuration is the CSI-RS resource configuration, determining the specific UE-specific information/configuration according to the RSRP/RSRQ information and/or CRS port information comprises:
   determining the UE-specific CSI-RS resource configuration based on correlation of beamforming vectors used for CSI-RS port virtualization and CRS port virtualization.

9. The transmitting method according to claim 8, wherein determining the UE-specific CSI-RS resource configuration comprises:
   grouping CSI-RS resources in an active antenna system according to the correlation of beamforming vectors used for the CSI-RS port virtualization and the CRS port virtualization;
   after receiving the reported RSRP/RSRQ information and/or the CRS port information, determining CSI-RS resources in a CSI-RS resource group corresponding to a CRS port with an RSRP/RSRQ value measured by the CRS port with the maximum receiving power, as the UE-specific CSI-RS resource configuration; or
   determining CSI-RS resources in CSI-RS resource groups corresponding to two CRS ports with RSRP/RSRQ values measured with the maximum receiving power and second maximum receiving power, as the UE-specific CSI-RS resource configurations.

10. The transmitting method according to claim 1, wherein before transmitting the precoded reference signal for the each of the CRS ports over the corresponding frequency-time resource, the method further comprises:
    respectively precoding a data signal and/or control signal corresponding to the each of the CRS ports based on the precoding vector adopted by the each of the CRS ports;
    when transmitting the precoded reference signal for the each of the CRS ports over corresponding frequency-time resource, the method further comprises:
    transmitting the precoded data signal and/or control signal for the each of the CRS ports over the corresponding frequency-time resource.

11. A reference signal receiving method in an active antenna system, comprising:
    receiving a notification of number of Cell-specific Reference Signal (CRS) ports, wherein the number of the CRS ports is larger than 1; and
    receiving a reference signal over a time-frequency resource.

12. The receiving method according to claim 11, further comprising:
    obtaining Reference Signal Receive Power (RSRP)/Reference Signal Received Quality (RSRQ) information and/or CRS port information by measurement based on the CRS ports; wherein number of RSRP/RSRQ values in the RSRP/RSRQ information is larger than or equal to 1.

13. The receiving method according to claim 11, wherein the RSRP/RSRQ information and/or CRS port information comprises:
    an RSRP/RSRQ value measured by a CRS port with the maximum receiving power and a corresponding CRS port index; or
    RSRP/RSRQ values measured by the CRS ports; or
    an RSRP/RSRQ value measured by CRS port 0 and a relative RSRP/RSRQ value of another port to that of the CRS port 0; or
    RSRP/RSRQ values measured by N CRS ports and corresponding CRS port indexes, N is larger than 1 and less than total number of the CRS ports.

14. The receiving method according to claim 11, further comprising:
    receiving a precoded data signal and/or control signal, which are demodulated based on the CRS ports.

15. A reference signal transmitting device in an active antenna system, comprising:
    a notification module, to set number of Cell-specific Reference Signal (CRS) ports and transmit a notification of number of the CRS ports, wherein the number of the CRS ports is larger than 1;
    a precoding module, to precode a reference signal with a different precoding vector for each of the CRS ports, wherein number of elements in the precoding vector is equal to number of transmit antennas, which correspond to the CRS ports; and a transmitting module, to transmit the precoded reference signal for the each of the CRS ports over a corresponding frequency-time resource.

16. The transmitting device according to claim 15, further comprising:
a Reference Signal Receive Power (RSRP)/Reference Signal Received Quality (RSRQ) receiving module, to receive Reference Signal Receive Power (RSRP)/Reference Signal Received Quality (RSRQ) information and/or CRS port information; wherein number of RSRP/RSRQ values in the RSRP/RSRQ information is larger than or equal to 1.

17. The transmitting device according to claim 16, wherein the RSRP/RSRQ receiving module is further to determine specific UE-specific information/configuration according to the RSRP/RSRQ information and/or CRS port information.

18. The transmitting device according to claim 15, wherein the precoding module is further to respectively precode a data signal and/or control signal corresponding to the each of the CRS ports based on the precoding vector adopted by the each of the CRS ports; and the transmitting module is further to transmit the precoded data signal and/or control over the time-frequency resource.

19. A reference signal receiving device in an active antenna system, comprising:
a signaling receiving module, to receive a notification of number of Cell-specific Reference Signal (CRS) ports, wherein the number of the CRS ports is larger than 1; and
a signal receiving module, to receive a reference signal over a time-frequency resource.

20. The receiving device according to claim 19, further comprising:
a measurement report module, to obtain Reference Signal Receive Power (RSRP)/Reference Signal Received Quality (RSRQ) information and/or CRS port information by measurement based on the CRS ports; wherein number of RSRP/RSRQ values in the RSRP/RSRQ information is larger than or equal to 1.

21. The receiving device according to claim 19, wherein the signaling receiving module is further to receive a data signal and/or control signal over the time-frequency resource.

* * * * *